Feb. 19, 1952 M. HORSKY 2,586,044
MEANS FOR TAKING UP SLACK IN LEAD SCREW DEVICES
Filed Dec. 6, 1948 2 SHEETS—SHEET 2

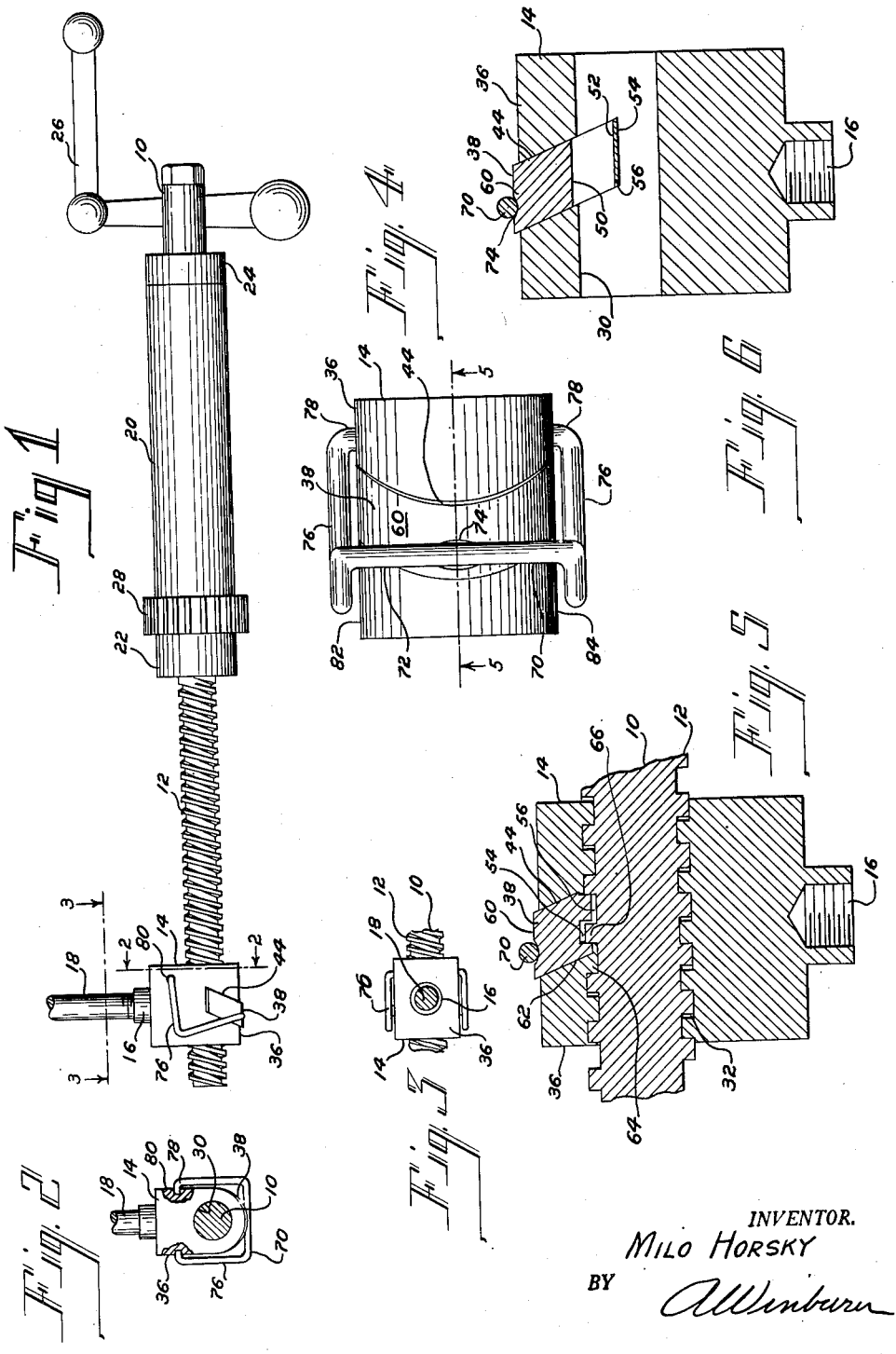

INVENTOR.
MILO HORSKY
BY
*Al Winburn*
ATTORNEY

Patented Feb. 19, 1952

2,586,044

UNITED STATES PATENT OFFICE 2,586,044

MEANS FOR TAKING UP SLACK IN LEAD SCREW DEVICES

Milo Horsky, Long Island City, N. Y., assignor to John W. Gasser, Woodside, N. Y.

Application December 6, 1948, Serial No. 63,810

12 Claims. (Cl. 74—441)

This invention relates to the engagement of threaded parts with each other, and particularly to the enhancement of the fit of such parts together to avoid play therebetween.

An object of the invention is to provide means for engagement of the threaded portion of a part without substantial play therebetween.

Another object of the invention is to provide an improved form of nut for engagement with a threaded screw or shaft, and carrying means on said nut whereby the fit between the said means and the threads of said screw or shaft is tight.

Still another object of the invention is to provide means for eliminating or substantially reducing any play between threadedly engaged parts without the need for expensively machining the parts to close tolerances, ordinary commercial tolerances being sufficient.

A further object of the invention is to provide means for automatically taking up wear between threadedly engaged parts.

Still another object of the invention is to provide a novel combination of screw threaded shaft and nut or other part for threaded engagement therewith, in which means are provided for minimizing or eliminating the play therebetween, and which is simple in construction, inexpensive to manufacture, and adaptable for use with all types of threaded parts.

Other objects and advantages of the invention will become apparent from the following description of a preferred embodiment thereof as illustrated in the accompanying drawings, and in which, Fig. 1 is an elevational view of a threaded shaft in engagement with my improved novel form of nut;

Fig. 2 is a sectional elevation taken on plane 2—2 of Fig. 1;

Fig. 3 is a sectional plan view taken on plane 3—3 of Fig. 1;

Fig. 4 is a bottom elevational view of the nut of Fig. 1 apart from the other parts, and looking upward;

Fig. 5 is a sectional plan view taken on plane 5—5 of Fig. 4, showing the screw threaded therein;

Fig. 6 is a view similar to that of Fig. 5, but showing the parts preliminary to the threading thereof, with a spacer placed therein as explained in the specification;

Figure 8:
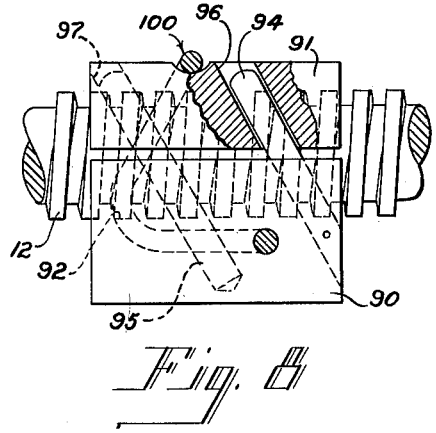
Fig. 8 is a cross-sectional view taken substantially on the line 8—8 of Fig. 7.

In providing threaded engagement between a shaft and a nut or the like, it is difficult to machine the parts to suitable degree of fit without considerable expense, since normal commercial tolerances allow a certain degree of clearance. This clearance is satisfactory when the parts are merely, for example, a nut and bolt holding some other parts together.

But when the threaded part is a lead screw on a lathe, which serves to advance a tool threadedly supported thereon, or a micrometer or other precision tool, then any play or tolerance in the threaded engagement will prevent accuracy in machining. Accordingly, the present invention provides means whereby a threaded shaft, as for example a lead screw may be engaged by another part, such as one carrying a tool for use in a lathe, with a minimum or even entire absence of play therebetween.

In order to understand clearly the nature of the invention and the best means for carrying it out, reference may now be had to the drawings, in which like numerals denote similar parts throughout the several views. For purposes of illustration, I have shown a shaft 10 which is threaded at 12 by a square thread for engagement with a nut 14, having a threaded recess 16 to receive the lower end of a post 18 for the support on the post 18 of a tool or other part of the lathe.

A bearing is shown at 20, and having an axial bearing bore extending therethrough to receive the unthreaded right hand portion of the shaft 10 shown in Fig. 1, the bearing being secured in any suitable manner in the lathe frame or other desired portion. Axial motion of the shaft 10 relative to the bearing 20 is blocked by means of the collars 22 and dial 24 as is well known in the art, or otherwise, so as to constrain the shaft 10 to rotation only.

Turning of the shaft 10 may be accomplished by means of the handle or crank 26, or in any other suitable manner, as by means of power applied to a gear 28 secured to and rotatable with the shaft 10.

It will be seen that the nut 14 has an axial bore 30 which is threaded as shown in Figs. 1 and 5, with threads 32 to engage with the threaded portion 12 of the shaft 10. Fig. 5 illustrates the clearance between the threads of shaft 12 and the threads of the bore 30 of the nut 14. It is this clearance which causes considerable looseness between the nut and shaft and is difficult of representation in the drawing without considerable exaggeration and enlargement of the parts.

My purpose is to take up all of a portion of such clearance at at least one portion of the nut 14, so that such clearance is of no effect once the invention is applied. For simplicity of production, the nut 14 is divided into two parts, a main part 36 and an auxiliary part 38, the part 38 being movable with respect to the part 36 and fitting into a slot 44 cut into the main body 36 of the nut 14. It will be seen that the parallel side walls of the slot 44 are more inclined toward the axis of the shaft 10, as seen in Fig. 5, than the inclination of the axes of the sides of the threads of the shaft and of the main body portion 36 of the nut 14.

What we desire to do, as clearly illustrated in Fig. 5, is to introduce a wedging action so as to crowd something more than the normal breadth of a thread on the bore of the main nut body 36 into the space between any two adjacent threads on the threaded shaft 12. Hence, if any clearance exists between the nut body and the shaft, such will be taken up by the excess of metal introduced by the wedging action.

We may, for convenience, speak of the portion 38 which effects the wedging action, as the nut tightener, since that is what it does. Having formed the inclined slot 44 in the main nut body 36, we then form the nut tightener 38 which may be of the same material as the main nut body 36 and of dimensions to fit smoothly into the slot 44 for free sliding movement therein, but with a minimum of play in a direction parallel to the axis of the screw shaft 10.

In the process of manufacture of my invention, the unthreaded axial bore 30 in the nut body 36 has already been formed therethrough, as shown in Fig. 6, and at matching semi-bore 50 extending wholly through the nut tightener 38. Then I introduce between the lower edges 52 of the nut tightener and the lower surfaces 54 the slot 44, two spacers 56 which elevate the nut tightener 38 to some appreciable extent as shown in Figs. 5 and 6, so that its upper or outer surface projects beyond the surface of the main nut body 36. The spacers 56 may also be interconnected by a U-shaped connector of any suitable type, if desired.

The parts being in the relative positions of Fig. 6, I then bore threadedly right through, forming the threads both on the inside of the axial bore of the main nut body 36 and the inner curved portion of the nut tightener 38. It will be seen that when the threads are thus formed on the inside of the axial bore of the main nut body 36, they are of uniform depth and breadth, to match with the threads of the shaft 12 which is to engage therewith. However, because of the insertion of the spacers 56 as aforementioned, to offset the nut tightener 38, that is, to displace it by the thickness of the spacers 56 from the axis of the bore 30 of the body 36, so that the thread portions cut into the inner curved surface 50 of the nut tightener 38 will be shallower in a radial direction than those on the inside of the bore 30 of the nut body 36. The thickness of the spacers may conveniently be about 60 per cent of the thread height of the shaft 12.

I then deepen the thread portions in the nut tightener bore in any suitable manner, as by grinding them, to approximate the dimensions shown in Fig. 5, giving some radial clearance as shown at 54 in Fig. 5. I also grind down the inner curved portions of the threads on the inside of the nut tightener 38 as shown, to give some radial clearance as shown at 56 and 54 in Fig. 5.

It will be seen that by exerting pressure upon the outer surface 60 of the nut tightener 38, its threads are pressed inwardly, as shown best in Fig. 5, to crowd into the spaces between the threads on the shaft 12, as for example, along the line 62 between the remaining portion of the thread 64 on the nut body 36 and the thread portion 66 on the shaft 12, taking up any clearance or play therebetween, and hence eliminating any play between the nut 14 and the shaft 12. If desired, the body 36 and the nut tightener 38 may be of different metals.

Spring pressure is exerted inwardly upon the outer surface 60 of the nut tightener 38 by means of the U-shaped spring clamp 70, the central portion 72 of which extends through a groove 74 in the surface 60, and which has its legs bent as shown at 76, with their feet 78 bent inwardly toward each other to seat in recesses 80 formed in the two side walls 82 and 84 of the nut body 36, as shown in Fig. 2.

It is noted that the groove 74 in the member 38 which receives the spring portion 72 and the recess 80 which receive the feet 78 are in a line parallel to the inclined axis of the direction of movement of the member 38 thereby providing maximum efficiency of spring action on the said member 38.

I have found that satisfactory results are obtained when the angle of direction of movement of the member 38 with respect to the plane of the wall of the threads of the threaded shaft is between approximately 10 degrees to appproximately 36 degrees.

Figure 9:
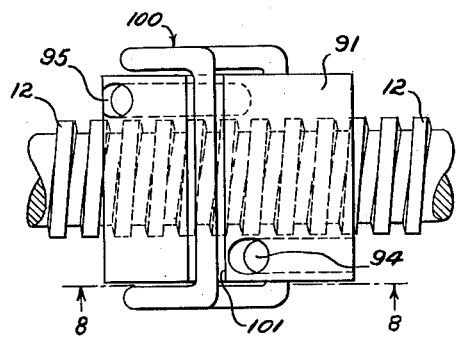
Fig. 9 is a top plan view thereof, partly in section.
Figure 10:
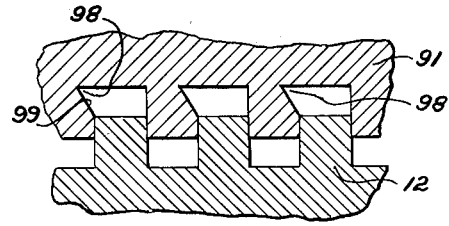
Fig. 10 is an enlarged view of a portion of the device shown in Fig. 8 illustrating a detail of construction thereof.

In Figs. 8 through 10, I have shown a modified form of my invention in which the same principle of operation is employed as that shown and described in connection with Figs. 1 through 7 of the drawings in which all the parts employed are the same with the exception of the nut member. In this form of my invention, the nut member, similar to the member 14, is composed of a main part 90 and an auxiliary part 91. It it noted that the auxiliary part in this case is co-extensive with the main part 90. In threading the bore 92 the same process is employed as previously described in connection with the threading of the bore 30, by the use of spacers, resulting in a space 93 separating the parts 90 and 91 when the threaded shaft 12 is passed through the threaded bore 92. To guide the angular movement, the auxiliary part 91 with respect to the main part 90, I provide a pair of pins 94 and 95 fixed at their lower ends to the main part 90 and projecting beyond said part 90 through openings 96 and 97 respectively in the auxiliary part 91. The openings 96 and 97 in the auxiliary part 91 are slightly larger in diameter than the pins 94 and 95 to permit unhampered relative sliding movement. It is noted that, as in the case of the member 38, in the Figs. 1 through 7 form of my invention, the movement of the auxiliary part 91 is guided in a direction inclined to the side walls of the threads of the threaded shaft 12. While in the drawings, this inclination is shown to be approximately 30 degrees it is understood that other angles of inclination can be employed. Satisfactory results have been obtained when the angle of inclination of the pins 94 and 95 with respect to the threads of the threaded shaft 12 ranges from approximately 10 degrees to approximately 35 degrees.

As in the case of the auxiliary member 38, and for the same reason, the internal threads of the member 91 are deepened as shown in Fig. 10 of the drawings and if desired, an additional undercut 98 is provided for a part of the threads. By reason of the undercut 98, the device will remain efficient for its intended purposes even if the side walls 99 of the thread of the auxiliary member 91 are worn away from use or deformed.

A spring member 100 similar in design and function to the spring member 70 serves to normally resiliently urge the auxiliary member 91 in a guided angular direction toward the threaded shaft 12. A recess 101 in the auxiliary member 91 serves to removably maintain the spring 100 in effective position, the said spring being pivotally mounted on the main part 90, as in the case of the Figs. 1 through 7 form of my invention.

Figure 7:
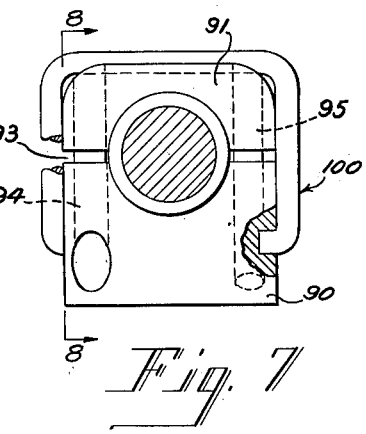
Fig. 7 is an enlarged, elevational view similar to Fig. 2, but illustrating a modified form of my invention.

As clearly seen in Fig. 1, the oblique movement of the nut tightening member 38 in a direction toward the threaded bore 39 of the nut body 14 is limited by the bottom walls of the slotted opening 44 to thereby prevent locking of the said nut tightening member 38 with respect to the threaded shaft. Similarly, as seen in Figs. 7 and 8, the means to prevent the locking of the nut tightening member 91 is the top surface of the main body member 90.

While in the drawings I have illustrated my invention as applied to the use of a lathe lead screws with the lead screw shaft having square threads, it is understood that my invention can also be employed for many other uses where precision operation is essential and where it is desired to reduce to a minimum or entirely eliminate play between a nut member and a threaded shaft, and it is equally effective on all other types of threads.

Attention is drawn to the fact that while in accordance with my invention as above described, the auxiliary or movable part of the nut resiliently frictionally engages the side walls of the threads of the lead screw to take up slack, no binding or locking action will result because the movable part of the nut by its construction and arrangement will still permit ready movement of the lead screw in either direction at all times.

Although I have described my invention in specific terms, it will be understood that variations may be made in size, shape, materials and arrangement without departing from the spirit and scope of the invention.

I claim:

1. A nut for engagement with a threaded shaft, comprising a main nut body having a bore threaded to engage with the said threaded shaft received therein, said nut body having a slot formed therein, and a nut tightening member movably disposed in said slot and adapted to engage with the threads of said threaded shaft to take up any play between the main nut body and the threaded shaft, means for guiding the movement of said nut tightening member in an oblique path with respect to the axis of the bore and means for limiting the oblique movement of said nut tightening member in a direction toward said bore whereby to prevent locking.

2. The construction according to claim 1, including member for biasing said nut tightening means into constant engagement with the threads of said threaded shaft.

3. The construction according to claim 1, including threads on the inner surface of said nut tightening member to engage with the threads of said threaded shaft, and resilient means for biasing said nut tightening means into constant engagement of its threads with the threads of said threaded shaft.

4. A nut member having a threaded bore for engagement with a threaded shaft, said nut member comprising a main part and an auxiliary part, said auxiliary part being movable with respect to said main part, means for guiding the movement of said auxiliary part in an oblique direction with respect to said bore, resilient means for normally urging said auxiliary part to move in such oblique direction and toward said threaded bore, whereby to automatically take up any play between the threaded shaft and the threaded nut member and means for limiting the said oblique movement of said auxiliary part in a direction toward said threaded bore whereby to prevent locking.

5. The construction according to claim 4 in which the said resilient means for normally urging the movement of said auxiliary part comprises a spring having one end thereof carried by said main part, the other end of said spring being adapted to engage said auxiliary part at a selected point.

6. The construction according to claim 5 characterized further in that the point of attachment of said spring with said main part and the selected point of engagement of said spring with said auxiliary part are in a line substantially parallel to the direction of guided movement of said auxiliary part.

7. The construction according to claim 4 in which the direction of guided movement of said auxiliary part is at an angle of from approximately 10 degrees to approximately 36 degrees with respect to the plane of the side surfaces of the wall of the threads of said threaded shaft.

8. The construction according to claim 4 in which a portion of the internal threads of the said auxiliary member are undercut for the purposes set forth.

9. In combination, a threaded shaft and a nut member engaged on said shaft, said nut comprising a main body part having a bore threaded to engage with the threads on said shaft, and an auxiliary part having a threaded portion engageable with the threads on said threaded shaft, said auxiliary part being movable with respect to said main part, means for guiding the movement of said auxiliary part in an oblique direction, resilient means for normally urging said auxiliary part to move in such oblique direction toward the threads on said threaded shaft whereby to automatically take up any play between the threaded shaft and the threaded nut member, and means for limiting the said oblique movement of said auxiliary part in a direction toward said threaded shaft whereby to prevent locking.

10. In combination, a threaded shaft and a nut member engaged on said shaft, said nut comprising a main body part having a bore threaded to engage with the threads on said shaft, and an auxiliary part having a threaded portion engageable with the threads on said threaded shaft, said auxiliary part being movable with respect to said main part, means for guiding the movement of said auxiliary part in an oblique direction, resilient means for normally urging said auxiliary part to move in such oblique direction toward the threads on said threaded shaft whereby to automatically take up any play between the threaded shaft and the threaded nut member, means to prevent locking of said auxiliary part with respect to said shaft, said last named means comprising radial clearance between the threads on said auxiliary part and the threads on said shaft.

11. The construction according to claim 4 in which the direction of guided movement of said auxiliary part is at an angle of less than approximately 45 degrees with respect to the wall of the threads of said threaded shaft.

12. The construction according to claim 1 in which said slot in said nut body is provided with parallel walls and in which the said walls are more inclined toward the axis of the shaft than the inclination of the axes of the threads of said threaded bore.

MILO HORSKY.

REFERENCES CITED

The following references are of record in the file of this patent:

UNITED STATES PATENTS

| Number | Name | Date |
|---|---|---|
| 1,153,861 | Dudley et al. | Sept. 14, 1915 |
| 1,726,377 | Armitage | Aug. 27, 1929 |
| 2,204,693 | Parsons | June 18, 1940 |
| 2,278,962 | Young | Apr. 7, 1942 |
| 2,315,343 | Linsley | Mar. 30, 1943 |
| 2,485,464 | Stott | Oct. 18, 1949 |
| 2,493,000 | Linsley | Jan. 3, 1950 |